United States Patent
Pribble et al.

(10) Patent No.: US 12,217,526 B2
(45) Date of Patent: *Feb. 4, 2025

(54) VALIDATING IDENTIFICATION DOCUMENTS

(71) Applicant: Capital One Services, LLC, McLean, VA (US)

(72) Inventors: Jason Pribble, McLean, VA (US); Daniel Alan Jarvis, Vienna, VA (US); Swapnil Patil, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,352

(22) Filed: Sep. 18, 2023

(65) Prior Publication Data

US 2024/0005691 A1 Jan. 4, 2024

Related U.S. Application Data

(63) Continuation of application No. 17/358,138, filed on Jun. 25, 2021, now Pat. No. 11,763,590.

(51) Int. Cl.
| | |
|---|---|
| *G06V 10/44* | (2022.01) |
| *G06K 7/14* | (2006.01) |
| *G06V 30/413* | (2022.01) |
| *G06V 30/418* | (2022.01) |
| *G06V 40/16* | (2022.01) |

(Continued)

(52) U.S. Cl.
CPC ......... *G06V 30/418* (2022.01); *G06K 7/1413* (2013.01); *G06V 10/44* (2022.01); *G06V 30/413* (2022.01); *G06V 40/168* (2022.01); *G06V 40/33* (2022.01); *G06V 30/10* (2022.01)

(58) Field of Classification Search
CPC .. G06V 30/418; G06V 30/413; G06V 40/168; G06V 40/33; G06V 10/44; G06V 30/10; G06K 7/1413

See application file for complete search history.

(56) References Cited

U.S. PATENT DOCUMENTS

| | | |
|---|---|---|
| 8,358,826 B1 | 1/2013 | Medina, III et al. |
| 8,542,921 B1 | 9/2013 | Medina |

(Continued)

FOREIGN PATENT DOCUMENTS

| | | |
|---|---|---|
| GB | 2377333 A | 1/2003 |
| WO | 2021005405 A1 | 1/2021 |

*Primary Examiner* — Syed Haider
(74) *Attorney, Agent, or Firm* — Sterne, Kessler, Goldstein & Fox P.L.L.C.

(57) ABSTRACT

The method, system, and non-transitory computer-readable medium embodiments described herein are directed to verifying documents. In various embodiments, a server may receive a first image of a front-side of a document. The server may extract a first feature of the front-side of the document from the first image and identify a first environmental feature from the first image. The server may receive a second image of a backside of the document and identify a second feature of the backside of the document from the second image. The server may also identify a second environmental feature from the second image. The server may verify the document by confirming that the first feature matches the second feature and the first environmental feature matches the second environmental feature.

20 Claims, 6 Drawing Sheets

(51) Int. Cl.
  *G06V 40/30* (2022.01)
  *G06V 30/10* (2022.01)

(56) References Cited

U.S. PATENT DOCUMENTS

| | | |
|---|---|---|
| 8,688,579 B1 | 4/2014 | Ethington et al. |
| 10,410,309 B2 | 9/2019 | Rodriguez et al. |
| 10,855,914 B1 | 12/2020 | Prasad et al. |
| 10,956,728 B1 | 3/2021 | Voutour |
| 11,062,130 B1 | 7/2021 | Medina, III |
| 11,062,131 B1 | 7/2021 | Medina, III |
| 11,392,912 B1 | 7/2022 | Pollack et al. |
| 11,446,949 B1 | 9/2022 | Buentello et al. |
| 2003/0122804 A1* | 7/2003 | Yamazaki ............. G06F 1/1626 345/179 |
| 2006/0157559 A1 | 7/2006 | Levy et al. |
| 2007/0016790 A1* | 1/2007 | Brundage ............ B42D 25/333 713/176 |
| 2009/0024944 A1 | 1/2009 | Louch et al. |
| 2011/0121066 A1* | 5/2011 | Tian ...................... G06K 19/14 235/494 |
| 2014/0032406 A1 | 1/2014 | Roach et al. |
| 2016/0210621 A1* | 7/2016 | Khan ................... G06T 1/0028 |
| 2017/0200247 A1 | 7/2017 | Kuklinski et al. |
| 2018/0033020 A1 | 2/2018 | Viens et al. |
| 2018/0108101 A1* | 4/2018 | Rodriguez ........... G06K 7/1417 |
| 2018/0219681 A1* | 8/2018 | Geiman ................ H04L 9/3231 |
| 2019/0073824 A1 | 3/2019 | Chui et al. |
| 2019/0370988 A1 | 12/2019 | Anderson et al. |
| 2020/0380598 A1 | 12/2020 | Spector et al. |
| 2021/0004581 A1 | 1/2021 | Bathory-Frota et al. |
| 2022/0277066 A1 | 9/2022 | Levine et al. |
| 2022/0414370 A1 | 12/2022 | Pribble et al. |

\* cited by examiner

VALIDATING IDENTIFICATION DOCUMENTS

CROSS-REFERENCE TO RELATED APPLICATIONS

This application is a continuation of U.S. application Ser. No. 17/358,138, filed Jun. 25, 2021, the disclosure of which is incorporated herein in its entirety.

FIELD

This disclosure is in the technical field of authenticating identification documents using image analysis.

BACKGROUND

Issuers of identification documents often include features on the front side and backside of the identification document. The features may be associated with the user of the identification card. For example, the features on the front side may include an image, name, date of birth, height, organ donor status, hair color, eye color, or address. The backside of the identification document may include the same, additional, or fewer features. The backside may also include a barcode. The barcode may be embedded with one or more features also included on the front side of the identification document.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for verifying identification documents.

Entities, such as financial institutions, government agencies, educational institutions, corporations may allow users to execute transactions using their website or mobile applications. The entities' websites or mobile applications may verify the users' identification, allowing them to submit images of the front side and backside of their identification document via the website or mobile application. As a result, the entities allow the users to submit an image of their identification document via the website or mobile application. The entities may require an image of the front side and backside of the identification document. However, conventional systems do not have the capability of verifying that the image of the front side of the identification document corresponds to the same identification card as the image of the backside of the identification document. This can result in a given user submitting images of different identification cards and committing fraudulent activity. For example, a given user may attempt to alter the information on the front or back side of the identification card and submit the altered identification card to verify their identity.

Various embodiments described herein solve this problem by verifying that the images of the front side and backside of the identification document correspond to the same identification document. In various embodiments, a server may receive a first image of a front-side of an identification document. The server may extract a first feature of the front-side of the identification document from the first image using optical character recognition (OCR) and identify a first environmental feature from the first image. Next, the server may receive a second image of a backside of the identification document and identify a second feature of the backside of the identification document from the second image. The server may also identify a second environmental feature from the second image. Moreover, the server may verify the identification document by confirming that the first feature matches the second feature, and the first environmental feature matches the second environmental feature. The first environmental feature and second environmental features include lighting, background, resolution, or color balance.

The various embodiments described herein allow for verifying that the images of the front side and backside of the identification document correspond to the same identification document by matching features on the front side and backside of the identification document and matching environmental features in the images of the front side and backside of the identification document. This prevents verification of identification documents that have been altered or doctored. Additionally, the various embodiments described herein do not permit the verification of identification documents based on an image of the front side of one identification document and an image of the backside of a different identification document. Therefore, the various embodiments described herein prevent fraudulent activity.

Figure 1:
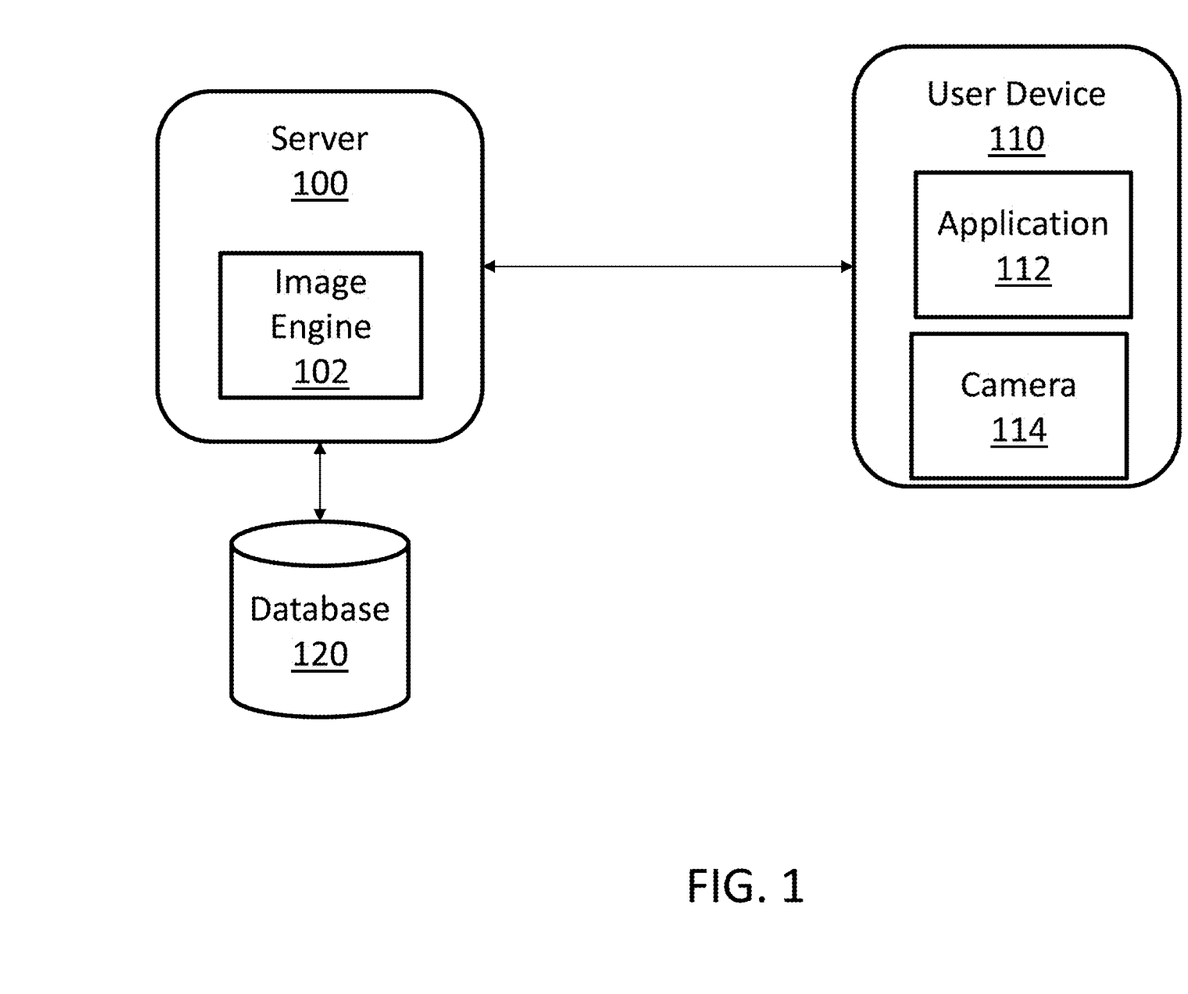
FIG. 1 is a block diagram of a system for verifying identification documents, according to various embodiments.

FIG. 1 is a block diagram of a system for verifying identification documents, according to various embodiments. The system can include a server 100, user device 110, and database 120. Server 100 may communicate with user device 110 and database 120.

The devices of the system for identifying invalid identification documents can be connected through wired connections, wireless connections, or a combination of wired and wireless connections. As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In various embodiments, user device 110 may execute application 112. Application 112 may be associated with an entity such as a financial institution, government agency, educational institution, corporation, etc. A user may use application 112 to execute transactions associated with the entity. One or more of the transactions may require identity verification. Furthermore, registering on the application may also require identity verification. As a result, application 112 may verify the user's identification based on an image of the user's identification document. The identification document may include but is not limited to a government issued ID (e.g., a driver's license, passport, etc.), employee badge, school ID, etc.

The identification document may include features. The features may include text, images, colors, markings, invalidation marks, etc. For example, the features may include the user's name, address, gender, date of birth, image, etc. The features may also include a logo of the issuer (e.g., state, city, company, etc.), name of the issuer, holograms, etc. Furthermore, the identification document may include features on a front side and a backside. For example, the front side of the identification document may include the user's picture, name, address, gender, date of birth, organ donor status, class, etc. The backside of the identification document may include a barcode, Quick Response (QR) code, class, restrictions, endorsements, etc. The barcode or QR code, for example, may be embedded with information such as the user's name, address, or date of birth.

User device 110 may also include a camera 114. However, any image capturing device may be used with user device 110. Camera 114 may be an image capturing device configured to capture still and/or moving images. Camera 114 may become operational in response to user device 110 launching application 112. Camera 114 may continuously transmit image frames to application 112 in response to becoming operational. The image frames may include objects in the field of view of camera 114. An image frame may be an image of the area within the field of view of camera 114. The image frame may be a live frame of the objects in the area within the field of view of camera 114.

The user may place an identification document within the field of view of camera 114. Camera 114 may continuously transmit image frames of the identification document to application 112. Application 112 may analyze each image frame to verify the image quality. Applicant 112 may do this independently of server 100 or in conjunction with server 100. Application 112 may provide (near) real-time feedback regarding the image quality. Once application 112 determines that the image quality of an image frame meets one or more predetermined conditions, application 112 may cause camera 114 to capture an image of the identification document automatically. In various embodiments, application 112 may prompt the user to provide an input to capture the image. The captured image of the identification document may be transmitted to server 100.

Application 112 may require the user to submit images of the front side and backside of the identification document for identity verification. As a result, the user may use camera 114 and application 112 to submit an image of the front side of the identification document and a different image of the back side of the identification document. Once the images of the front side and backside of the identification document have been captured, application 112 may transmit the images to server 100.

Figure 2A:
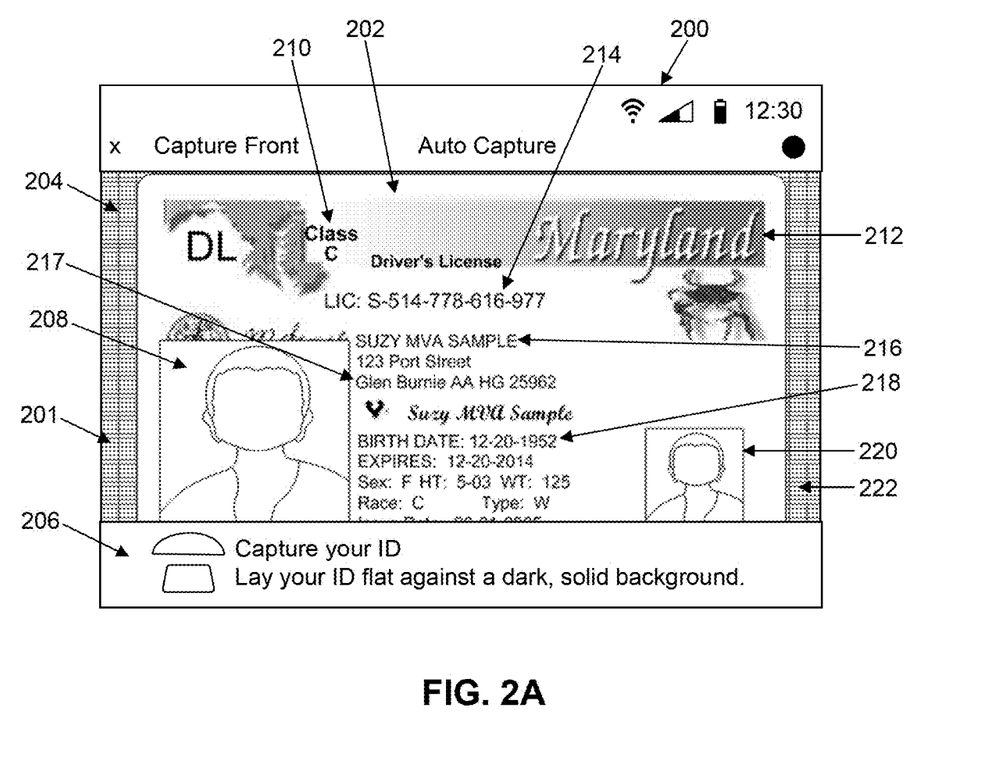
FIGS. 2A-2B illustrate a graphical user interface (GUI) used for submitting an image of identification documents, according to various embodiments.
Figure 2B:
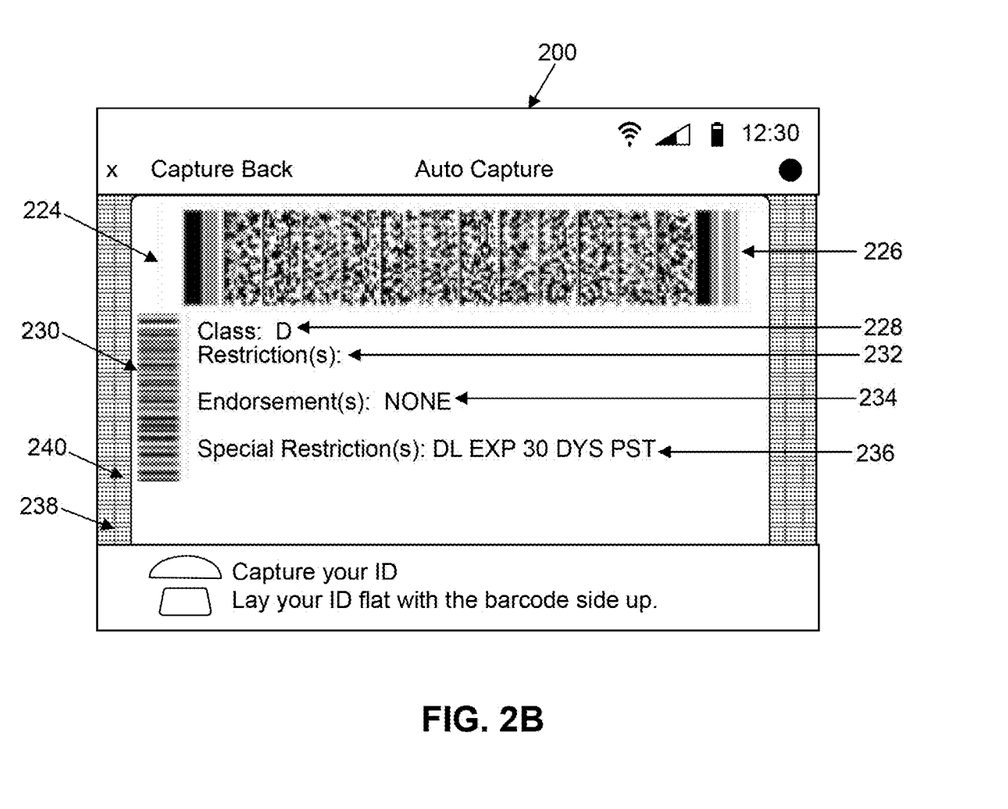

Server 100 may include image engine 102. Image engine 102 may receive the images of the front side and backside of the identification document. Image engine 102 may be configured to analyze the images of the front side and backside of the identification document to verify the image quality and validity of the identification document. More specifically, image engine 102 may verify that the images of the front side and backside of the identification document correspond with the same identification document based on matching the first feature from the front side of the identification document and the second feature from the back side of the identification document and matching a first environmental feature from an image of the front side of the identification document with a second environmental feature from the image of the backside of the identification document. The identification and matching of the features and environmental features will be described in further detail with respect to FIG. 2.

Image engine 102 may also be configured to use a machine-learning algorithm to identify a type of identification document by classifying the images of the front side and backside of a given identification document. For example, image engine 102 may execute a deep learning algorithm, neural networks, convolutional neural networks, etc. As a result, image engine 102 may be initially trained using a set of training data. The training data may be previously classified images of the front side and backside of various identification documents. Furthermore, image engine 102 may be continuously trained when classifying the images of the front side and backside of a given identification document.

Database 120 may be one or more data storage devices. Database 120 may be configured to store training data and images of the front side and backside of identification documents. Database 120 may also be configured to store information about identification documents issued by various issuers. The information may include the features included by a given issuer on the front side and backside of the identification document. Different issuers may include different features on the front side and backside of the identification document. Image engine 102 may use the information to determine which features to identify on a given identification document.

FIGS. 2A-2B illustrate a graphical user interface (GUI) of an application used for submitting images of the front side and backside of identification documents. FIGS. 2A-2B shall be described with reference to FIG. 1; however, it is not limited to this embodiment.

With respect to FIG. 2A, in various embodiments, application 112 may be launched to execute transactions or view information associated with an entity (e.g., financial institution). This may require verification of a user's identification. As a result, application 112 may render GUI 200 on user device 110 to capture an image of the front side and backside of a user's identification document. In addition, GUI 200 may include a viewing area 201 and directions for capturing an image of identification document 206.

Camera 114 may become operational in response to user device 110 launching application 112. Application 112 may prompt the user to capture a front side 202 of the identification document. Once camera 114 is made to be operational, camera 114 may continuously capture image frames of the area within the field of view of camera 114. The area within the field of view of camera 114 may be rendered in a viewing area 201 of GUI 200.

The user may place their identification document in the area within the field of view of camera 114 such that front side 202 is rendered on GUI 200. As a non-limiting example, the identification document may be a driver's license issued by the state of Maryland. Front side 202 may include features such as a user's primary image 208, class 210, issuer name 212, identification number 214, name 216, address 217, date of birth 218, and secondary image 220. In addition, front side 202 may also include features such as the user's height, weight, gender, etc. Primary image 208 and secondary image 220 may include the face of the user.

Different issuers of identification documents may include different features on front side 202. For example, some states may also include organ donor status on the driving license. As another example, passports may include the user's country of birth.

Camera 114 may continuously capture image frames of front side 202 and transmit the image frames to application 112. Application 112 may analyze each image frame to determine the image quality of the image frame. Application 112 may require the image quality of the image frame to comply with predetermined parameters. For example, application 112 may determine that the image frame has no glare, is well-lit, is flat against a dark surface, is legible and in-focus, is the right size, and has all edges visible.

The image frames may include front side 202 and a background 222. The background may be a surface on which the identification document is disposed. Application 112 may detect the edges of front side 202 and place a boundary 204 around the edges. Application 112 may detect the edges by identifying feature points in a given image frame. The feature points may be visually distinct features (e.g., objects, surfaces, colors, etc.). Application 112 may identify clusters of feature points on common surfaces or objects (e.g., front side 202 and background 222). Application 112 may detect the edges of front side 202 based on the difference between the feature points on front side 202 and the feature points in background 222. By doing so, application 112 may overlay boundary 204 around the edges of front side 202.

Once application 112 has verified the image quality of an image frame, application 112 may instruct camera 114 to capture a first image of front side 202 automatically. In various embodiments, once application 112 has verified the image quality of an image frame, application 112 may prompt the user to provide an input to capture a first image of front side 202. In response to camera 114 capturing the first image of front side 202, application 112 may transmit the first image of front side 202 to server 100. The first image of front side 202 may include front side 202, boundary 204, and background 222.

With respect to FIG. 2B, once application 112 transmits the first image of front side 202 to server 100, application 112 may prompt the user to capture a backside 224 of the identification document. Camera 114 may continuously capture image frames of the area within the field of view of camera 114. Therefore, the area within the field of view of camera 114 may be rendered in a viewing area 201 of GUI 200. The user may place their identification document in the area within the field of view of camera 114 such that backside 224 is rendered on GUI 200.

Backside 224 may include features such as a first barcode 226, user's class 228, a second barcode 230, restriction(s) 232, endorsement(s) 234, and special restriction(s) 236. First barcode 226 may be embedded with user information such as name, identification number, address, date of birth, etc. Different issuers of identification documents may include different features on backside 224.

Camera 114 may continuously capture image frames of back side 224 and transmit the image frames to application 112. Application 112 may analyze each image frame to determine the image quality of the image frame.

The image frames may include backside 224 and a background 240. Background 240 may be a surface on which the identification document is disposed. Application 112 may detect the edges of backside 224 and place a boundary 238 around the edges, as described above with respect to front side 202.

Once application 112 has verified the image quality of an image frame, application 112 may instruct camera 114 to capture a second image of backside 224 automatically. Alternatively, in various embodiments, once application 112 has verified the image quality of an image frame, application 112 may prompt the user to provide an input to capture a second image of backside 224. In response to camera 114 capturing the second image of backside 224, application 112 may transmit the second image of backside 224 to server 100. The second image of backside 224 may include backside 224, boundary 238, and background 240.

Server 100 may receive the first image of front side 202 and the second image of backside 224. Image engine 102 may identify and extract one or more features on front side 202 from the first image. For example, image engine 102 may use optical character recognition (OCR) to identify identification number 214, name 216, date of birth 218, etc. In various embodiments, image engine 102 may also extract primary image 208 and secondary image 220.

Image engine 102 may also identify one or more environmental features from the first image. The one or more environmental features may include but are not limited to background, lighting, resolution, color balance, and image information included in the first image metadata. In one example, image engine 102 may identify background 222 in the first image. Image engine 102 may determine that background 222 is outside the edges of front side 202 based on boundary 204. Image engine 102 may identify background 222's color, pattern, size, etc.

In another example, image engine 102 may determine information about the lighting in the environment of the first image. In particular, image engine 102 may determine the average intensity and color correction of the first image.

In another example, image engine 102 may determine the resolution of the first image by determining the pixels per inch (PPI) of the first image. Furthermore, image engine 102 may determine the color balance using color detecting algorithms.

Image engine 102 may also identify and extract one or more features on backside 224 from the second image. In one example, image engine 102 may implement a barcode reader to scan first barcode 226 to extract the user information embedded in first barcode 226. As a non-limiting example, first barcode 226 may be a PDF417 barcode. First barcode 226 may be a linear barcode that includes 4 bars and spaces and 17 units. Furthermore, first barcode 226 may be a stacked barcode, and the user information encoded in first barcode 226 can be read or extracted by a linear scan over first barcode 226. The PDF417 barcode is often used by government and commercial entities on documents such as identification documents, boarding cards, postage stamps, travel visas, etc. As indicated above, the user information may include the user's name, identification number, address, date of birth, etc. Additionally, image engine 102 may extract class 228, restrictions 232, endorsements 234, and/or special restrictions 236.

In various embodiments, secondary image 220 on front side 202 may be a transparent holographic image that is also visible on backside 224. Image engine 102 may extract one or more features of secondary image 220 on front side 202 from the first image and one or more features of the secondary image as visible on backside 224 from the second image.

Image engine 102 may also identify one or more environmental features from the second image. The one or more environmental features may include but are not limited to background, lighting, resolution, color balance, and image information included in the first image metadata. Image engine 102 may identify the one or more environmental features from the second image the same was as described above with respect to the first image.

Image engine 102 may compare the one or more features on front side 202 extracted from the first image with the one or more features on backside 224 extracted from the second image. Furthermore, image engine 102 may compare the one or more environmental features extracted from the first image with the one or more environmental features extracted from the second image.

For example, image engine 102 may determine whether the identification number 214, name 216, and date of birth extracted from the first image match the identification number, name, and date of birth. This allows image engine 102 to determine that the first and second images correspond to an identification document belonging to the same user. Furthermore, image engine 102 may determine whether the lighting, resolution, color balance, and background extracted from the first image are within a threshold amount of the lighting, resolution, color balance, and background extracted from the second image. By determining that the lighting, resolution, color balance, and background extracted from the first image are within a threshold amount of the lighting, resolution, color balance, and background extracted from the second image, image engine 102 may determine that the first or second image have been captured in the same environment by the same camera (e.g., camera 114). Moreover, this allows image engine 102 to determine that the first and second images are not doctored or edited.

In various embodiments, image engine 102 may match one or more features secondary image 220 on front side 202 and one or more features of secondary image 220 as visible on backside 224. For example, by matching the one or more features secondary image 220 on front side 202 with the one or more features of secondary image 220 as visible on backside 224, image engine 102 may determine secondary image 220 as shown on front side 202 and backside 224 corresponds to the same user.

Similarly, image engine 102 may compare one or more features of secondary image 220 as visible on backside 224 with one or more features of primary image 208 extracted from the first image. For example, by matching the one or more features of secondary image 220 as visible on backside 224 with one or more features of primary image 208, image engine 102 may determine that secondary image 220 as shown on backside 224 and primary image 208 as shown on front side 202 correspond to the same user.

In various embodiments, front side 202 and backside 224 may include the user's signature. Image engine 102 may extract the user's signature on front side 202 from the first image and the user's signature on backside 224 from the second image. Image engine 102 may compare the user's signature extracted from the first and second image using a signature recognition algorithm (e.g., clustering, morphology, offline signature recognition, static signature recognition, etc.) to determine whether the user's signature on front side 202 and backside 224 corresponds to the same user.

In various embodiments, image engine 102 may use machine learning to determine the type of identification document in the first and second image. For example, image engine 102 may use machine learning to determine that front side 202 and backside 224 correspond to an identification document issued by the same issuer (e.g., same state) or correspond to the same type of identification document. The machine learning algorithms may include but are not limited to: neural networks, convolutional neural networks (CNN), supervised learning, unsupervised learning, word embeddings, etc.

As a non-limiting example, image engine 102 may use a CNN algorithm to determine that front side 202 and backside 224 correspond to an identification document issued by the same issuer (e.g., same state) or correspond to the same type of identification document. The CNN algorithm is a supervised deep-learning algorithm used to classify documents using image recognition.

The CNN algorithm may need to be trained using previously classified identification documents. Image engine 102 may retrieve the previously classified identification documents from database 120. The CNN algorithm may be trained in two phases, a forward phase, and a backward phase. The forward phase includes convolution layers, pooling layers, and fully connected layers. Convolution layers may apply filters to an input image (e.g., an image of a previously classified identification document) to generate a feature map. The pooling layers may generate a reduced feature map. The fully connected layers may then classify the features of the image using weights and biases to generate an output. The output may be a classification of the input image. The classification may be a type of identification document or the issuer of the identification document. The values of the filters, weights, and biases may be parameters received via user input.

Once trained, the CNN algorithm may classify the type of identification document or the issuer of the identification document. For example, this allows image engine 102 to verify that the issuer of front side 202 and backside 224 is the same. Furthermore, this allows image engine 102 to verify that the type of the identification document of front side 202 and backside 224 is the same.

Image engine 102 may generate a confidence score in response to matching one or more features one or more features on front side 202 extracted from the first image with the one or more features on backside 224 extracted from the second image, and determining that one or more environmental features extracted from the first image are within a threshold amount of one or more environmental features extracted from the second image. The confidence score may represent a likelihood that the front side 202 and backside 224 correspond with the same identification document. The higher the confidence score, the more likely that front side 202 in the first image and backside 224 in the second image correspond with the same identification document.

The confidence score may be generated based on the total number of matches of features on front side 202 extracted from the first image matching the features on backside 224 extracted from the second image and the total number of features extracted from the first image that are within a threshold amount of one or more environmental features extracted from the second image. Image engine 102 may also assign weights to different features on front side 202 and backside. The weights may indicate the importance of the feature. For example, features that indicate a user's identity (e.g., user name, identification number, address, etc.) allow image engine 102 to verify that the front side and backside correspond to an identification document of the same user, which provides a strong likelihood that the front side and backside correspond to the same identification document. As a result, the features that indicate the user's identity may be assigned a greater weight. Image engine 102 may generate the confidence score based on the features on front side 202 extracted from the first image matching the features on backside 224 extracted from the second image matching features on backside 224 extracted from the second image, and the respective weight of each feature.

As indicated above, image engine 102 may also use machine learning to verify that front side 202 and backside 224 correspond to the same type of identification document or issued by the same user. This allows image engine 102 to confirm that a user has not submitted images of different identification documents or issued by different issuers. As a result, this may provide further verification that front side 202 and backside 224 correspond to the same identification document. Image engine 102 may use the verification that front side 202 and backside 224 correspond to the same type of identification document or issued by the same user when generating the confidence score. The validation process can be based on any of the features discussed above and is not limited to using the confidence score. For example, an indication that any environmental feature, characteristic, or data (or two or more metrics) from the front of the image does not match the same environmental feature, characteristic, or data from the back can result in failed validation.

Image engine 102 may verify or validate the user's identification document based on the confidence score being higher than a threshold amount. Conversely, image engine 102 may fail to verify or validate the user's identification document based on the confidence score being lower than the threshold amount. In response to failing to verify or validate the user's identification document, image engine 102 may cause the display of a message on application 112, indicating that the identification document could not be verified or validated. In response to failing to verify or validate the user's identification document, image engine 102 may prevent the user from executing any transactions on application 112.

Figure 3:
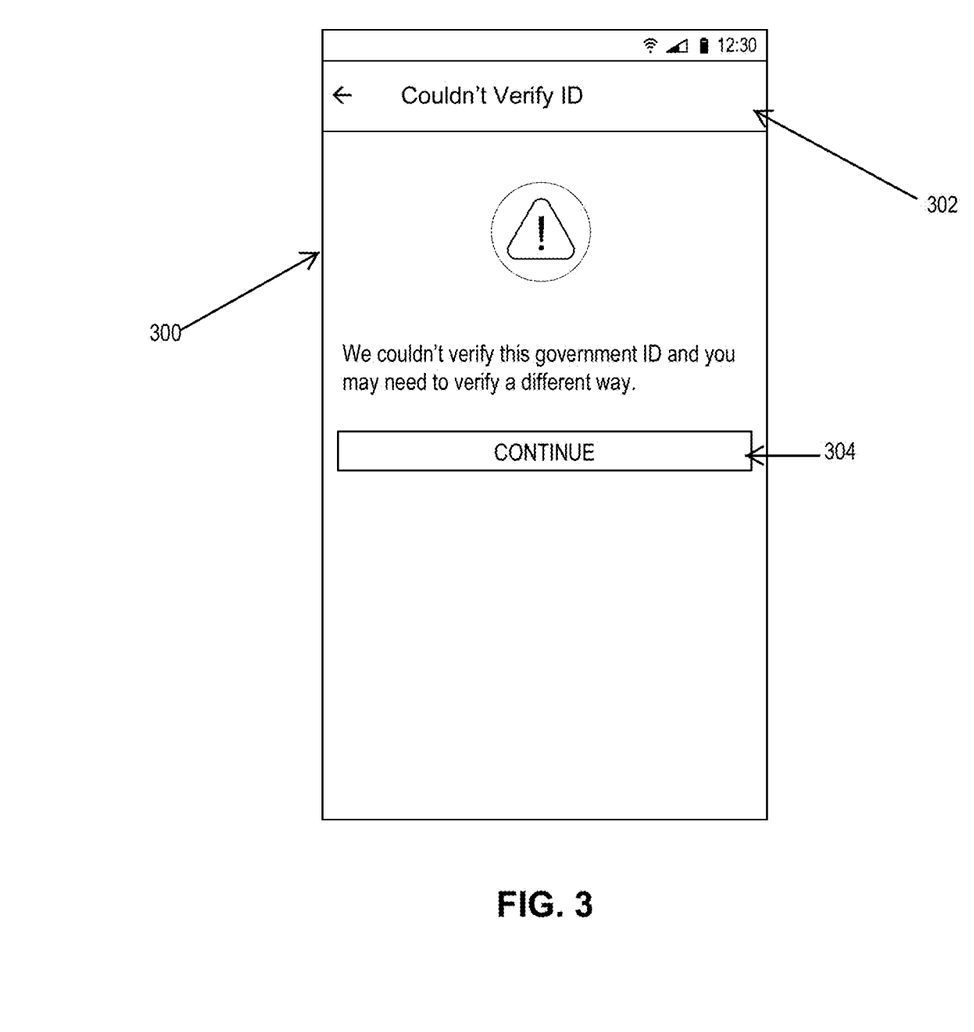
FIG. 3 illustrates a GUI including a message indicating that the identification document could not be verified, according to various embodiments.

FIG. 3 illustrates a GUI including a message indicating that the identification document could not be verified, according to various embodiments. FIG. 3 shall be described with reference to FIG. 1; however, it is not limited to this embodiment.

Image engine 102 may fail to verify or validate that the images of the front side and backside corresponded to the same identification document. As a result, image engine 102 may fail to verify the identification document and may cause application 112 to render GUI 300. GUI 300 may include a message 302, that the identification document could not be verified.

GUI 300 may also include a recommended action, indicating the user may need to attempt to verify their identity using a different identification document. GUI 300 may also include selection 304 to allow users to try a different identification document for identification verification.

Figure 4:
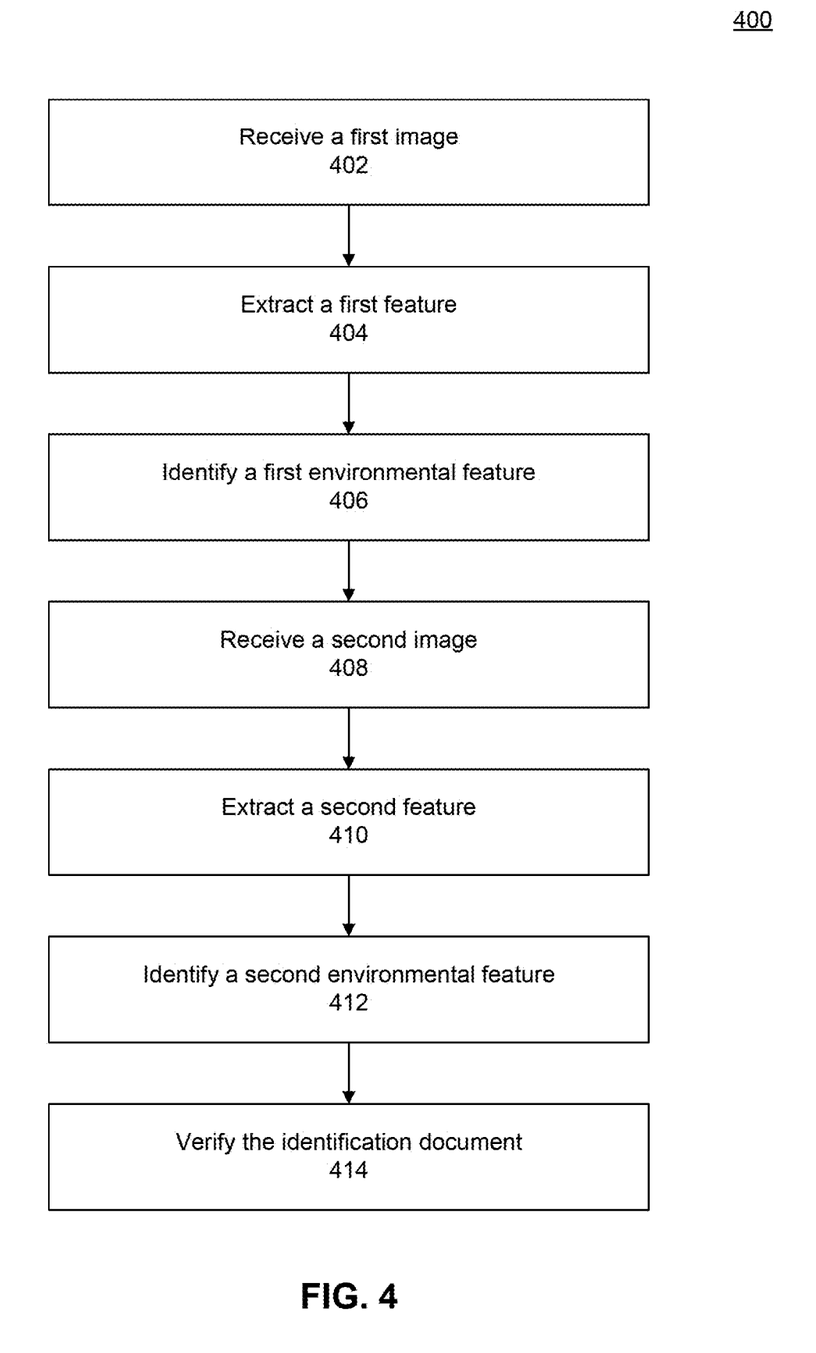
FIG. 4 is a flowchart illustrating a process for verifying an identification document, according to various embodiments.

FIG. 4 is a flowchart illustrating a process for validating an identification document according to various embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to those example embodiments.

In operation 402, server 100 receives a first image of a front side of an identification document. The front side may include features such as a user's image, name, address, date of birth, gender, identification number, etc. The front side may also include features such as the issuer name and logo. In addition, the first image may include the front side of the identification document, a boundary surrounding the edges of the front side, and a background (e.g., the surface on which the identification document is disposed).

In operation 404, server 100 extracts a first feature from the front side of the identification document from the first image. For example, server 100 may use OCR to extract the user's name, address, date of birth, or identification number from the first image. Additionally, the first feature may be imperceptible data on the front side of the identification document. For example, image steganography may be used to hide text or image in the identification document that is not visible to a human. Server 100 may detect the imperceptible data by analyzing a bitmap of each pixel of the first image. The imperceptible data may include but is not limited to: a watermark, signature, serial number, etc. In various embodiments, server 100 may extract features from the user's image or the user's signature disposed on the front side.

In operation 406, server 100 identifies a first environmental feature from the first image. The environmental feature may be lighting, background, resolution, or color balance. Furthermore, the environmental feature may be indicative of the environment in which the first image was captured.

In operation 408, server 100 receives a second image of a backside of the identification document. The backside may include features such as a barcode, user's class, restrictions, special restrictions, etc. The barcode may be embedded with user information such as the user's name, address, date of birth, and identification number.

In operation 410, server 100 identifies a second feature of the backside of the identification document from the second image. Server 100 may implement a barcode reader to scan the barcode on the backside of the identification document. The server 100 may extract the user's name, address, date of birth, and/or identification number from the barcode. Additionally, the second feature may be imperceptible data on the backside (or front side) of the identification document. Server 100 may detect the imperceptible data by analyzing a bitmap of each pixel of the first image. The server may also extract other features on the backside of the identification document from the second image, such as the user's class, restrictions, special restrictions, etc.

In operation 412, server 100 identifies a second environmental feature from the second image. As indicated above, the environmental feature may be lighting, background, resolution, or color balance. Additionally, the environmental feature may be indicative of the environment in which the second image was captured.

In operation 414, server 100 verifies the identification document by confirming that the first feature matches the second feature, and the first environmental feature matches the second environmental feature. In particular, server 100 verifies that the front side and backside correspond to the same identification document. Server 100 may generate a confidence score that the front side and backside correspond to the same identification document. The confidence score may be generated based on the number of matches of the features extracted from the first image matching and features extracted from the second image. Alternatively, server 100 may assign weights to different features extracted from the first and second image. Server 100 may determine the confidence score based on the weights of the matched features. Server 100 may also generate the confidence score based on the number of matches between environmental features identified on the front side and the environmental features identified on the backside.

Figure 5:
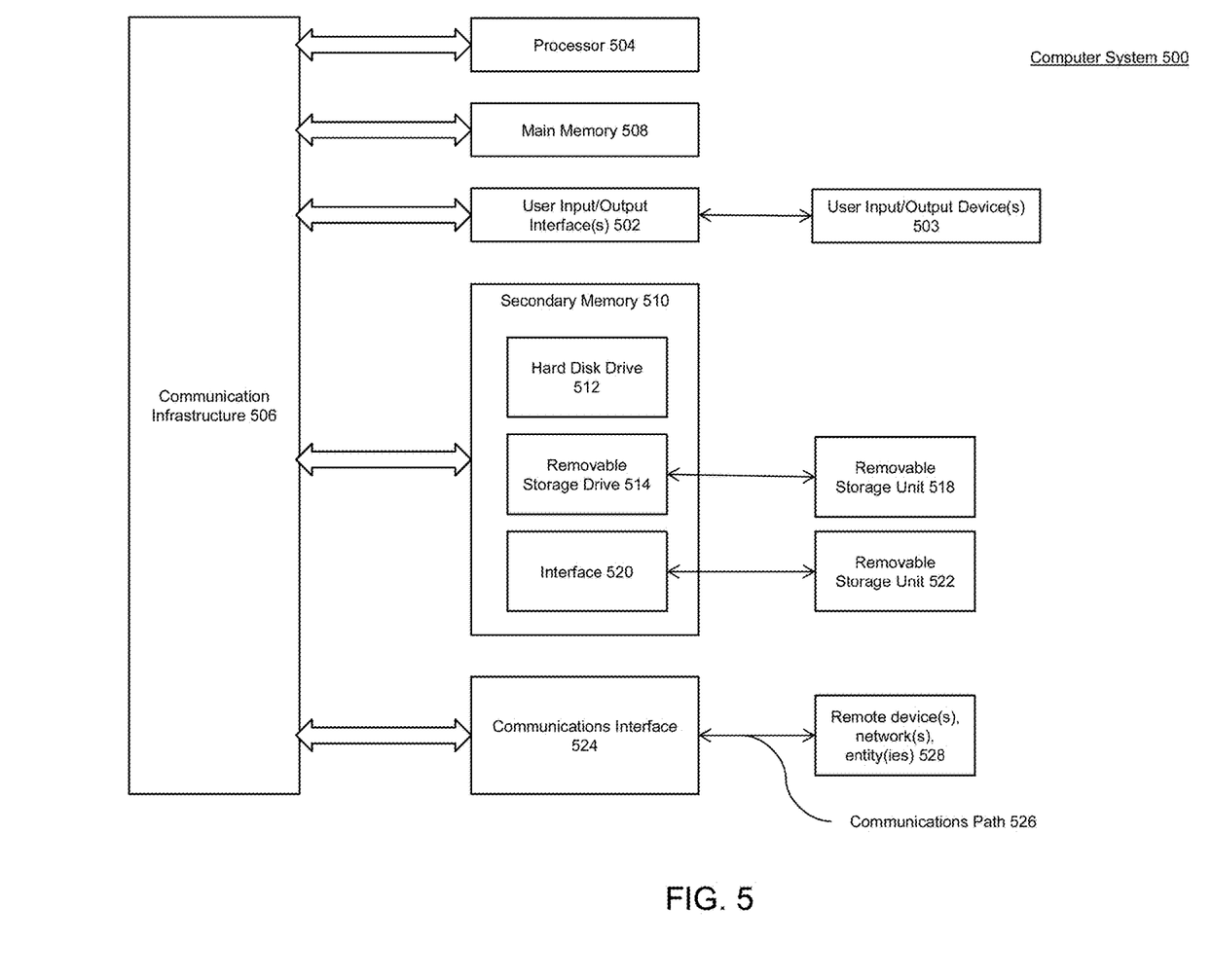
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 4. Furthermore, computer system 500 can be at least part of server 100, user device 110, and database 120, as shown in FIG. 1. For example, computer system 500 route communication to various applications. Computer system 500 can be any computer capable of performing the functions described herein.

Computer system 500 can be any well-known computer capable of performing the functions described herein. Computer system 500 includes one or more processors (also called central processing units, or CPUs), such as a processor 504. Processor 504 is connected to a communication infrastructure or bus 506.

One or more processors 504 can each be a graphics processing unit (GPU). In various embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer database. Removable storage drive 514 reads from and/or writes to removable storage unit 518 in a well-known manner.

According to various embodiments, secondary memory 510 can include other means, instrumentalities, or other approaches for allowing computer programs and/or other instructions and/or data to be accessed by computer system 500. Such means, instrumentalities, or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In various embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, various embodiments can be described using the expression "coupled" and "connected" along with their derivatives. These terms are not necessarily intended as synonyms for each other. For example, various embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method to validate a document, the method comprising:
    receiving, by a processor, a first image of a front-side of the document;
    identifying, by the processor, a type of the document using a machine learning algorithm based on the first image;
    extracting, by the processor, a first feature of the front-side of the document from the first image;
    identifying, by the processor, a first environmental feature from the first image, the first environmental feature being related to a capture of the first image by a camera;
    receiving, by the processor, a second image of a backside of the document;
    confirming, by the processor, the type of the document using the machine learning algorithm based on the second image;
    identifying, by the processor, a second feature of the backside of the document from the second image;
    identifying, by the processor, a second environmental feature from the second image, the second environmental feature being related to a capture of the second image by the camera; and
    verifying, by the processor, the document by confirming that the first feature matches the second feature, the first environmental feature matches the second environmental feature, and that the type of document is the same in the first and second image,
    wherein the first environmental feature and second environmental feature include at least one of: lighting, resolution, or color balance.

2. The method of claim 1, wherein the identifying of the second feature of the backside of the document from the second image comprises scanning a barcode on the backside of the document as displayed in the second image.

3. The method of claim 1, wherein the first feature includes an imperceptible data.

4. The method of claim 3, further comprising extracting, by the processor, the imperceptible data based on a bitmap of each pixel in the first image.

5. The method of claim 1, wherein the first environmental feature and second environmental feature further include a background, and identifying the background comprises:
    identifying, by the processor, a boundary of the document in the first and second image; and
    identifying, by the processor, a surface outside the boundary of the document in the first and second image.

6. The method of claim 1, wherein the first feature and the second feature each include at least one of: name, date of birth, height, organ donor status, hair color, eye color, or address.

7. The method of claim 1, wherein verification of the document indicates that the front-side of the document and the backside of the document correspond to a same document.

8. The method of claim 1, further comprising:
    extracting, by the processor, a first facial image of a user associated with the document from the first image;
    extracting, by the processor, a second facial image of the user associated with the document from the second image; and
    matching, by the processor, the first facial image to the second facial image.

9. The method of claim 1, further comprising:
    extracting, by the processor, a first signature disposed on the front-side of the document from the first image;
    extracting, by the processor, a second signature disposed on the backside of the document from the second image; and
    matching, by the processor, the first signature with the second signature.

10. A system to validate a document, the system comprising: at least one memory; and
    at least one processor coupled to the at least one memory, the at least one processor configured to:
        receive a first image of a front-side of the document;
        identify a type of the document using a machine learning algorithm based on the first image;
        extract a first feature of the front-side of the document from the first image;
        identify a first environmental feature from the first image, the first environmental feature being related to a capture of the first image by a camera;
        receive a second image of a backside of the document;
        confirm the type of the document using the machine learning algorithm based on the second image;
        identify a second feature of the backside of the document from the second image;
        identify a second environmental feature from the second image, the second environmental feature being related to a capture of the second image by the camera; and
        verify the document by confirming that the first feature matches the second feature, the first environmental feature matches the second environmental feature, and that the type of document is the same in the first and second image,
        wherein the first environmental feature and second environmental feature include at least one of: lighting, resolution, or color balance.

11. The system of claim 10, wherein the identifying of the second feature of the backside of the document from the second image comprises scanning a barcode on the backside of the document as displayed in the second image.

12. The system of claim 10, wherein the first feature includes an imperceptible data; and
    the at least one processor is further configured to extract the imperceptible data based on a bitmap of each pixel in the first image.

13. The system of claim 10, wherein the first environmental feature and second environmental feature further include a background, and identifying the background comprises:

identifying a boundary of the document in the first and second image; and identifying a surface outside the boundary of the document in the first and second image.

14. The system of claim 10, wherein the first feature and the second feature each include at least one of: name, date of birth, height, organ donor status, hair color, eye color, or address.

15. The system of claim 10, wherein verification of the document indicates that the front-side of the document and the backside of the document correspond to a same document.

16. The system of claim 10, wherein the at least one processor is further configured to:

extract a first facial image of a user associated with the document from the first image;

extract a second facial image of the user associated with the document from the second image; and match the first facial image to the second facial image.

17. A non-transitory computer-readable medium having instructions stored thereon that, when executed by at least one computing device, cause the at least one computing device to perform operations, the operations comprising:

receiving a first image of a front-side of a document;

identifying a type of the document using a machine learning algorithm based on the first image;

extracting a first feature of the front-side of the document from the first image using optical character recognition (OCR);

identifying a first environmental feature from the first image, the first environmental feature being related to a capture of the first image by a camera;

receiving a second image of a backside of the document;

confirming the type of the document using the machine learning algorithm based on the second image;

identifying a second feature of the backside of the document from the second image;

identifying a second environmental feature from the second image, the second environmental feature being related to a capture of the second image by the camera; and verifying the document by confirming that the first feature matches the second feature, the first environmental feature matches the second environmental feature, and that the type of document is the same in the first and second image, wherein the first environmental feature and second environmental feature include at least one of: lighting, resolution, or color balance.

18. The non-transitory computer-readable medium of claim 17, wherein the identifying of the second feature of the backside of the document from the second image comprises scanning a barcode on the backside of the document as displayed in the second image.

19. The non-transitory computer-readable medium of claim 17, wherein the first environmental feature and second environmental feature further include a background, and identifying the background comprises:

identifying a boundary of the document in the first and second image; and identifying a surface outside the boundary of the document in the first and second image.

20. The non-transitory computer-readable medium of claim 17, wherein verification of the document indicates that the front-side of the document and the backside of the document correspond to a same document.

* * * * *